May 22, 1945. E. V. HAMMOND 2,376,591
ANIMAL TRAP
Filed June 5, 1944   2 Sheets-Sheet 2
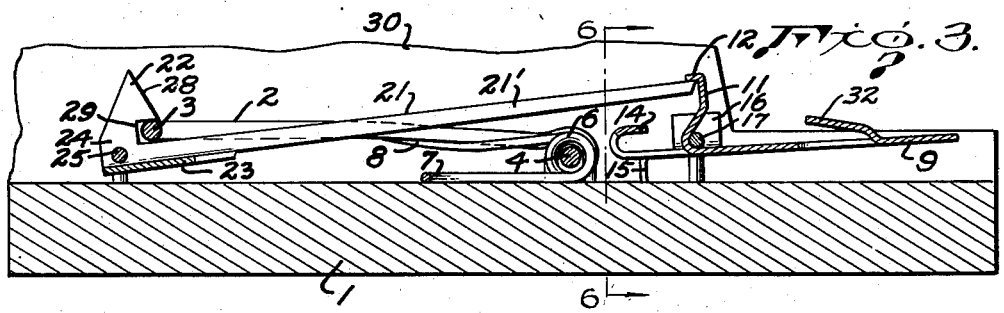
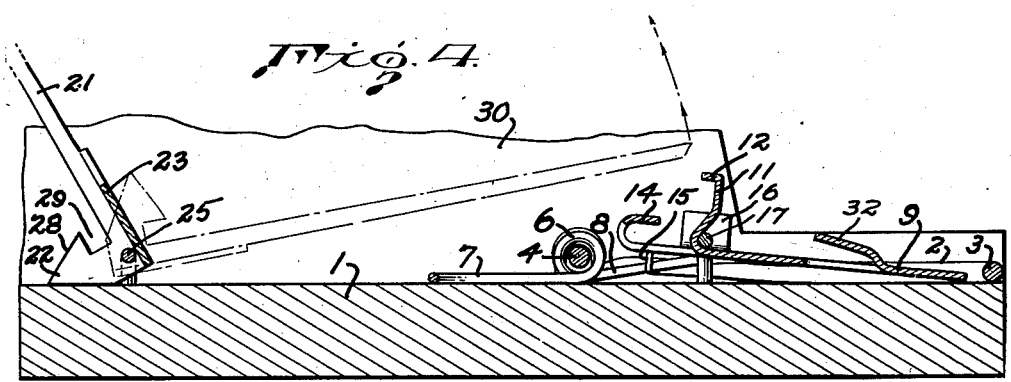
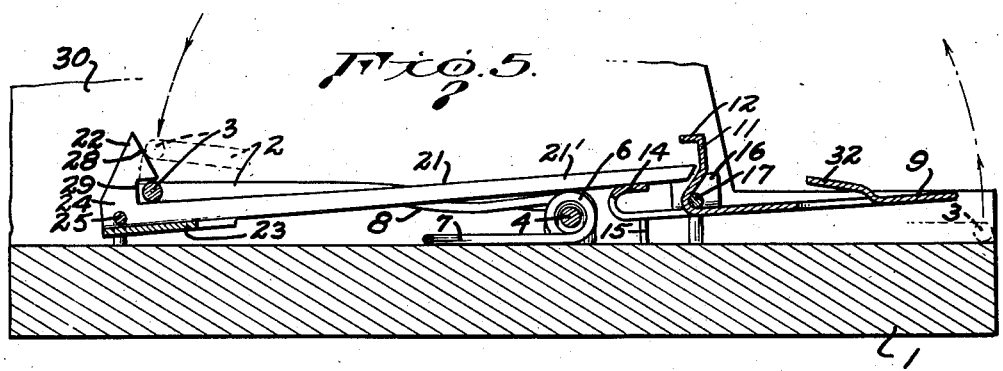
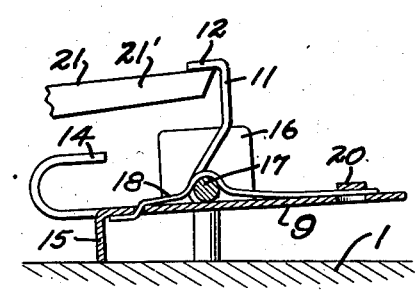
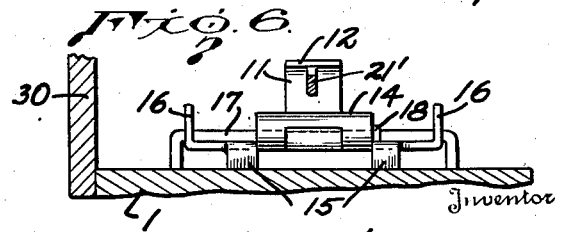

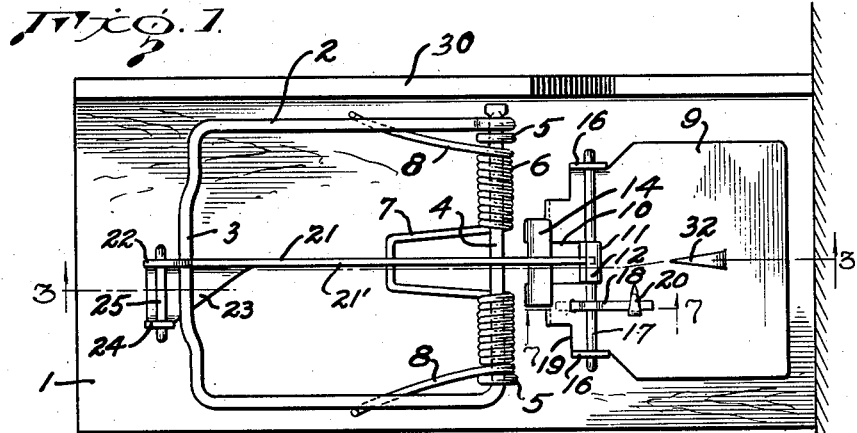

Patented May 22, 1945

2,376,591

UNITED STATES PATENT OFFICE 2,376,591

ANIMAL TRAP

Ernest V. Hammond, Columbia, Miss.

Application June 5, 1944, Serial No. 538,783

6 Claims. (Cl. 43—83.5)

The present invention relates to improvements in animal traps, and more specifically to a type which may be in the main economically manufactured from stampings and the parts of which are so arranged as to provide a very strong, self-setting device for trapping various kinds of rodents.

Of special importance is the design of the bait-holding pedal and trigger bar, the construction of which is such as to eliminate all necessity on the part of the user to place his hands in a position of danger while setting the trap. More particularly, the parts referred to are so constructed that the setting of the trap is automatically effected incident to swinging of the spring jaw into full open position, said swinging movement establishing a cooperative engagement between the trap jaw-locking bar and the trigger carried by the bait holder pedal.

Another important feature of construction resides in the provision of camming surfaces on the locking bar by means of which the bar is preliminarily shifted to permit interlocking engagement with the trap jaw and subsequent movement of the bait pedal to engage the trigger with the locking bar in setting of the trap.

Still other features of importance are found in the mountings of the locking bar and pedal whereby these parts are cooperative for resetting purposes.

Other and further objects and advantages of the invention will be hereinafter set forth and the novel features thereof defined by the appended claims.

In the drawings:

Figure 1 is a top plan view of a trap constructed in accordance with my invention, and showing the trap in set condition and located at the base of a wall or other object where the trap barrier assists in directing rodents onto the trap pedal for springing the trap;

Figure 2 is a view in side elevation of the trap of Figure 1, and further illustrating the relation of the trap to the base of the wall or other object;

Figure 3 is a cross sectional view, on a somewhat enlarged scale, taken through the trap on the line 3—3 of Figure 1, and particularly illustrating the set position of the working parts of the trap;

Figure 4 is a view generally similar to Figure 3, showing the parts of the trap in a sprung condition preliminary to setting of the same;

Figure 5 is a view similar to Figures 3 and 4, and illustrating the setting operation of the trap by the movement of the trap jaw in the direction of the arrows, and just preliminary to release of the downward pressure on the trap jaw;

Figure 6 is a sectional view taken on the line 6—6 of Figure 3;

Figure 7 is an enlarged fragmentary detail view showing the cooperative relation of the locking bar and trigger in the fully set position of the trap;

Figure 8 is a top plan view of the pedal blank preliminary to bending of the parts thereof into the form shown in the assembled views; and Figure 9 is a plan view of the locking bar blank preliminary to bending of the same into the form shown in the assembled views.

Like reference characters designate corresponding parts in the several figures of the drawings.

Referring to the drawings, and specifically describing the invention, I designates the base member which is of rectangular form and of wood or other material sufficiently strong to provide a rigid support for the trap mechanism later to be described. At one end of this base is mounted the jaw 2 made from a strong piece of wire bent into substantially rectangular shape, as clearly seen in the plan view of Figure 1, so as to provide the cross clamping bar 3 by which the animal is struck and held against the base. At the inner end of this jaw, the wire is bent transversely to form the cross pintle or pivot 4, which is secured to the base at each end by means of suitable fastenings or staples 5. The actuating spring 6 for the clamping jaw is coiled intermediate its length around the pintle 4, and is provided with an offset portion 7 at the center which engages with the base 1 to set up the tension in the spring, the respective ends 8 of which extend from the pintle 4 to a point midway of the jaw 2 at each side for actuating the jaw when the trap is sprung.

At one side of the pintle of the jaw is mounted the bait holder or pedal 9, which has a special form in view of the facility with which this element may be produced by stamping the same out of sheet metal of suitable gauge. The stamped blank previous to bending of the functioning parts into their operative positions is shown quite clearly in Figure 8. At one end, the die for stamping cuts a U-shaped slit 10 and the metal surrounded by the slit is bent upwardly and shaped at its upper edge to provide a trigger 11 and locking flange 12. The blank above referred to is cut at a second place in a similar manner, as indicated at 13, in spaced relation to the cut 10. This forms, when suitably bent up and back to overlie the end of the pedal, a cross bar 14 for setting purposes, as will hereinafter be more particularly pointed out. A tongue 15 is cut from the blank at each side of the part 14 last referred to, and these tongues are bent downwardly so as to constitute stops limiting the pivotal movement of the pedal about the pivot. The pedal blank is further cut to form the apertured ears 16, one at each side, and a long staple bar 17 is passed through the apertures 16' and into the base to mount the pedal member thereon.

In order to hold this pedal member in normal or substantially horizontal trap set position, I provide a spring 18 which engages in an opening 19 at one side of the pivot bar 17 and beneath a stamped-up tongue 20 at the other side of the bar. In view of the frictional engagement of the spring with the pivot bar 17, the pedal may be rocked about its pivot and remain in any position to which it is moved as hereinafter described.

The locking bar 21 is also of special construction in that it is stamped from sheet metal so as to form the long locking bar proper 21', the detent extension 22, the lateral stiffening or brace section 23, and the pivot ears 24. By bending the portion 23 at right angles along a line coinciding with the bottom of the arm 21', and then bending the ear 24 upwardly at right angles thereto, this locking element is arranged for attachment or mounting on the base 1 of the trap at a point opposite the side of the jaw pintle 4 from that occupied by the pedal 9. To effect this mounting, a staple member 25 passes through the apertures 26 and 27 in such manner as to position the locking arm 21' at a mid position and extending longitudinally with respect to the base and so that the extremity of the arm 21' may be lockingly engaged with the trigger flange 12. The detent extension 22 is provided with an inclined camming face 28 and is undercut so as to form the notch or detent 29 for lockingly engaging the cross bar 3 of the trap jaw. The notching of the metal substantially horizontally is important not only to form the detent 29 but to insure a safe interlock with the trap jaw to prevent accidental disengagement. As the jaw is engaged with the locking bar 21, it is caused to slide along the upper edge of the camming face 28 until it is completely beneath and in engagement with the detent 29, as shown in Figure 5 of the drawings most clearly, thus depressing the bar until its free end passes the trigger flange 12 and contacts the cross bar 14 of the pedal, which shifts the flange over the bar end to effect trap setting.

Before proceeding more fully with a description of the operation for setting the trap, another detail should be mentioned. One of the habits of a rodent, such as a mouse or a rat, is to run about the edge of the confining quarters or along the walls of a room, or about the base of articles in a room. I take advantage of this habit to force the rodent to cross the base of the trap at the pedal end of the same by provided a wall or barrier 30 attached to one side of the base and extending only to a point spaced from the end of the base at that end where the pedal is located. Thus, when the base of the trap is positioned against the base of a wall in a room, a narrow passage 31 is left between the end of the wall 30 and the wall of the room leading over the pedal, as shown best in Figure 2. This wall 30 serves to hide the mechanism of the trap other than the pedal, and the width of the pedal itself with respect to the platform or base 1 insures the rodent will quickly run onto the same and spring the trap. The pedal, it should be understood, is struck up with a second tongue 32 for fastening bait on the pedal, though it is to be understood that with the construction of trap above set forth it is not essential to supply bait.

In the setting of the trap thus described, the operator catches hold of the sides of the jaw 2 or the cross bar 3 and swings said jaw about its pivot 4 against the tension of the spring 6 until the cross bar strikes the camming surface 28 of the detent extension 22 on the end of the locking bar 21. This causes the free end of the bar or arm 21' to rise past the trigger 12, swinging upwardly about the staple pivot 25 in so doing until the cross bar 3 reaches the position of the notch 29 of the detent extension. The free end of the jaw 2 then in the continuation of the swinging movement contacts with the upper surface of the bar at the base of the notch 29 and causes the arm to move downwardly and the cross bar 3 to move into the notch of the extension 22.

At the same time that this takes place, the free end of the bar 21' contacts with the upper side of the cross bar 14 of the pedal 9, which raises the pedal and slightly rocks it in a counter-clockwise direction about its pivot until the flange 12 of the trigger 11 engages over the end of the bar 21'.

The swinging movement of the pedal just referred to is limited by the stop arms 15 coming into contact with the surface of the base. At that position, the end of the bar 21' is properly positioned beneath the trigger flange as shown in Figure 5. Thereupon, on release of the trap jaw during the setting operation, the bar rises slightly until it contacts the lower side of the trigger flange 12 as shown in Figure 3. During the latter movement of the trigger bar, the pedal 9 remains stationary, with the trigger in set position, due to the frictional pressure of the spring 18 on the pivot bar 17.

When the rodent steps upon the pedal 9, the latter swings clockwise about its pivot and disengages the trigger from the end of the arm 21', thereby freeing the locking arm or bar for swinging upwardly about its pivot by the pressure of the cross bar 3 bearing against the detent extension 22. As the bar 21' is swung upwardly, the cross bar 3 is freed from the detent, and the jaw under the influence of its spring tension moves over into clamping engagement with the animal on the pedal, clamping the animal between the cross bar 3 and the pedal or base extremity.

Thus it will be seen that a very strong trap may be provided, since in all of the operation of setting as above described the fingers of the operator are in nowise endangered, and it will be understood from the foregoing that the action of setting of the trigger and interengagement of the locking bar therewith, as well as with the jaw itself, is all automatic. When the animal has been released, the pedal is normally allowed to remain at rest on the base 1 until the trap is reset, which resetting merely requires the manual movement of the trap jaw in the manner previously described, all other moving parts of the trap being automatically operated responsive to movement of the trap jaw.

I claim:

1. An animal trap of the class described comprising a base, a jaw pivotally mounted thereon, a pedal pivotally mounted at one side of the jaw pivot and including a trigger, a locking bar pivotally mounted on the base at the side of the jaw pivot opposite the pedal and interlockingly engageable with the jaw incident to opening movement thereof into trap set position, contact means on the pedal arranged in the path of movement of the locking bar to trigger-engaging position and depressible by said bar to shift the trigger into the path of movement of the bar after passing the trigger as the jaw is moved into interengagement with said bar, and means normally operative upon the pedal when the contact means is depressed for holding the trigger in such position over the end of the locking bar for engagement with the latter on release of the jaw to thereby hold the trap in set position.

2. An animal trap of the class described comprising a base, a jaw pivotally mounted thereon, a pedal pivotally mounted at one side of the jaw pivot and including a trigger, a locking bar pivotally mounted on the base at the side of the jaw pivot opposite the pedal and interlockingly engageable with the jaw incident to opening movement thereof into trap set position, a depressible extension on the pedal at one side and beyond the trigger and in the path of movement of the locking bar, said extension upon contact of the bar therewith being adapted to rock the pedal and shift the trigger over the end of the locking bar when the trap is in set position, and means for normally holding the pedal and trigger in any position assumed by the same incident to contact of the locking bar with the extension aforesaid.

3. An animal trap of the class described comprising a base, a jaw pivotally mounted thereon, a pedal pivotally mounted at one side of the jaw pivot, said pedal being provided with an upstanding trigger, an abutment bar and stop means adjacent its pivot, friction means for holding the trigger in release and set positions, a locking bar pivoted to the base and having a notch at one end to engage about and hold the jaw in trap set position, and camming means on said bar preliminarily engageable by the jaw to raise the free end of the locking bar and thereby permit the jaw to engage with the notch, said jaw being operable as it enters the notch to depress the free end of the bar into engagement with the pedal abutment bar thereby rocking the trigger into position for engagement with the end of the locking bar when the trap is in set position.

4. In an animal trap of the class described, the combination of a base, a spring-tensioned jaw pivotally mounted on said base, a bait holder pivotally mounted at one side of said jaw pivot including a trigger extension, spring means engaging the holder pivot for frictionally maintaining the holder in elevated position above the base and a locking bar pivoted at the other side of the jaw mounting and having at one end a vertical extension formed with a notch and with a camming surface above said notch engageable by the jaw to swing the bar to allow the jaw to enter the notch, and also having a cam surface below the notch at one side of the bar pivot on which the jaw rides in entering the notch to rock the bar and trigger into trap set position.

5. In an animal trap of the class described, the combination of a base, a spring-tensioned jaw pivotally mounted on said base, a bait holder at one side of said mounting, a locking bar pivoted at the other side of the jaw mounting and having at one end a vertical extension formed with a notch and with a camming surface above said notch engageable by the jaw to swing the bar to allow the jaw to enter the notch, and also having a cam surface below the notch at one side of the bar pivot on which the jaw rides in entering the notch to rock the bar and trigger into trap set position, means automatically operable by the locking bar in moving to said trap set position for shifting the trigger over the free end of the bar to hold the trap in set position, and friction means coacting with the bait holder for holding the latter in said trap set position until the end of said bar is engaged with the trigger.

6. In an animal trap of the class described, the combination of a base, a spring-tensioned jaw pivotally mounted on said base, a bait holder at one side of said mounting including a trigger extension, a locking bar pivoted at the other side of the jaw mounting and having at one end a vertical extension formed with a notch and with a camming surface above said notch engageable by the jaw to swing the bar to allow the jaw to enter the notch, and also having a cam surface below the notch at one side of the bar pivot on which the jaw rides in entering the notch to rock the bar and trigger into trap set position, and a barrier wall attached to one side of the base and terminating at a point opposite the bait holder and spaced from the end of the base so as to form a narrow passage over the bait holder when the trap end is placed against a building wall or other object.

ERNEST V. HAMMOND.